(12) United States Patent
Vidyadhara et al.

(10) Patent No.: US 10,185,828 B2
(45) Date of Patent: Jan. 22, 2019

(54) SYSTEMS AND METHODS USING VIRTUAL UEFI PATH FOR SECURE FIRMWARE HANDLING IN MULTI-TENANT OR SERVER INFORMATION HANDLING SYSTEM ENVIRONMENTS

(71) Applicant: Dell Products L.P., Round Rock, TX (US)

(72) Inventors: Sumanth Vidyadhara, Bangalor (IN); Chandrasekhar Puthillathe, Bangalore (IN); Aniruddha Herekar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 237 days.

(21) Appl. No.: 15/070,639

(22) Filed: Mar. 15, 2016

(65) Prior Publication Data
US 2017/0270301 A1 Sep. 21, 2017

(51) Int. Cl.
*G06F 21/57* (2013.01)
*G06F 9/4401* (2018.01)
*G06F 9/44* (2018.01)

(52) U.S. Cl.
CPC .......... *G06F 21/575* (2013.01); *G06F 9/4411* (2013.01); *G06F 2221/034* (2013.01)

(58) Field of Classification Search
CPC .................................. G06F 21/57; G06F 9/44
See application file for complete search history.

(56) References Cited

U.S. PATENT DOCUMENTS

| 8,819,708 B2 | 8/2014 | Shutt et al. | |
| 2006/0069900 A1* | 3/2006 | Powers | G06F 12/0284 711/209 |
| 2006/0156415 A1* | 7/2006 | Rubinstein | G06F 21/445 726/27 |
| 2009/0063835 A1* | 3/2009 | Yao | G06F 12/1491 713/2 |
| 2012/0284495 A1 | 11/2012 | Domsch et al. | |
| 2013/0124843 A1* | 5/2013 | Bobzin | G06F 21/575 713/2 |
| 2015/0067297 A1 | 3/2015 | Arroyo et al. | |

(Continued)

OTHER PUBLICATIONS

Doran et al., "UEFI Boot Time Optimization Under Microsoft Windows 7", EFIS004, 2009, 34 pgs.

(Continued)

*Primary Examiner* — Kim Huynh
*Assistant Examiner* — Kevin M Stewart
(74) *Attorney, Agent, or Firm* — Egan Peterman Enders Huston

(57) ABSTRACT

Systems and methods are provided that may be implemented to securely load Unified Extensible Firmware Interface (UEFI) images (e.g., UEFI Applications, UEFI Drivers, UEFI firmware volumes, etc.) onto an information handling system from an authenticated (e.g., OEM authenticated) hardware image source device or "IO store" (e.g., such as USB device, network file system device, PCIe device, network storage, shared storage, dynamic RAM disk, etc.) based on a UEFI virtual device path that is mapped to an authenticated hardware device path that is established for the authenticated hardware image source device.

20 Claims, 3 Drawing Sheets

(56) References Cited

U.S. PATENT DOCUMENTS

| | | | | |
|---|---|---|---|---|
| 2015/0074387 A1* | 3/2015 | Lewis | ................... | G06F 21/575 |
| | | | | 713/2 |
| 2015/0317472 A1* | 11/2015 | Baentsch | .............. | G06F 9/4401 |
| | | | | 726/30 |
| 2016/0132322 A1* | 5/2016 | Jones | ...................... | G06F 9/445 |
| | | | | 717/168 |
| 2017/0147227 A1* | 5/2017 | Stabrawa | .............. | G06F 3/0608 |

OTHER PUBLICATIONS

Butcher et al., "Systems and Methods of Device Firmware Delivery for Pre Boot Updates", U.S. Appl. No. 14/596,627, filed Jan. 14, 2015, 36 pgs.

Liu et al., "Systems and Methods to Securely Inject Binary Images and Code Into Firmware", U.S. Appl. No. 14/792,083, filed Jul. 6, 2015, 27 pgs.

"Unified Extensible Firmware Interface (UEFI) Credential-Based Access of Hardware Resources", U.S. Appl. No. 14/703,912, filed May 5, 2015, 20 pgs.

\* cited by examiner

SYSTEMS AND METHODS USING VIRTUAL UEFI PATH FOR SECURE FIRMWARE HANDLING IN MULTI-TENANT OR SERVER INFORMATION HANDLING SYSTEM ENVIRONMENTS

FIELD

This invention relates generally to information handling systems and, more particularly, to firmware handling for information handling system components.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When UEFI Secure Boot is enabled for a server, Basic Input/Output System (BIOS) and Unified Extensible Firmware Interface (UEFI) firmware perform authentication of component firmware, UEFI apps and operating system (OS) images. This authentication mechanism is time consuming as each of these images has to be signed using secure boot keys and also be verified by UEFI Secure boot algorithm. Such verification has adverse impacts on performance of boot process. In the past, these verification mechanisms have sometimes been skipped to enable a faster boot process for images/packages supplied by the server manufacturer itself. The decision making to bypass this verification is based on a pre-determined UEFI Hardware device path in the UEFI Core library of BIOS. However, this approach is not scalable when UEFI applications (apps) are hosted on devices that are created dynamically outside of the server BIOS. Examples of such devices include shared and network storage. The UEFI device path for such devices will vary and cannot be pre-determined. Further, such devices cannot be trusted and the authenticity of such applications is a security concern. Therefore, UEFI apps hosted on devices created dynamically outside of the server BIOS need a complete secure boot authentication which affects the server boot time.

FIG. 1 illustrates conventional UEFI secure boot methodology 100 that is performed by a processing device of a server to authenticate and load a UEFI component image such as device firmware image, UEFI application or OS Loader. Third party (e.g., vendor) UEFI components (e.g., such as UEFI driver or UEFI application) are conventionally loaded in this manner as shown in FIG. 1. In step 102 of FIG. 1, Driver Execution Environment (DXE) loader starts, and then in step 104 DXE loader accesses a secure input/output (IO) store (e.g., such as network storage or local universal serial bus device) to verify the device path of an image before beginning to retrieve and load the image, in this case a UEFI driver or UEFI application. Next, in step 106, DXE loader begins the loading process for the image from the IO store by checking to see if image code is signed by the OS manufacturer (e.g., such as Microsoft) to ensure authenticity. If the image is determined to be so signed in step 106, then loading of the image is completed by the DXE loader in step 107. However, if in step 106 it is determined in step 106 that the image is not signed, then the image is not loaded, but instead the image load fails in step 108. In the conventional methodology 100 of FIG. 1, all original equipment manufacturer (OEM)-supplied UEFI applications, OS loaders, server manufacturer firmware updates, OS driver packs, etc. all must be signed by an external party and stored in the server baseboard management controller (BMC). To successfully load a UEFI component image, a signed version of the UEFI component image must first be provided by the OS manufacturer or other external third party. This process is time consuming and adversely affects faster releases of third party (e.g., vendor) UEFI components, server manufacturer UEFI components, etc.

SUMMARY

Disclosed herein are systems and methods that may be implemented to securely load UEFI images (e.g., UEFI Applications, UEFI Drivers, UEFI firmware volumes, etc.) onto an information handling system from an authenticated (e.g., OEM authenticated) hardware image source device or "IO store" (e.g., such as USB device, network file system device, Peripheral Component Interconnect Express "PCIe" device, network storage, shared storage, dynamic RAM disk, etc.) based on a UEFI virtual device path (VDP) that is mapped to an authenticated actual UEFI device path (such as hardware device path or any other UEFI device path) that is established for the authenticated hardware image source device. To securely load such UEFI images, a virtual device path (VDP) protocol may be implemented to create a trusted hardware device path mechanism (e.g., OEM trusted hardware device path mechanism) between actual UEFI device path to virtual device path (e.g., as a hardware device path-to-virtual device path mapping relationship for each authenticated hardware image source device), and a UEFI DXE loader may be given the right privilege to run and/or load any UEFI images listed by the VDP protocol for the Virtual DevicePath for a given authenticated hardware image source device without requiring one or more of the loaded UEFI images themselves to be signed by an OS manufacturer (e.g., such as Microsoft) or other third party.

Using the disclosed systems and methods, a given hardware image source device may itself be authenticated, for example, by a computer manufacturer, OEM, or another designated entity having knowledge and/or control of the hardware image source device and the UEFI images (e.g., such as OEM or computer manufacturer proprietary files) contained thereon and/or provided therefrom. In one embodiment, a given hardware image source device (e.g., such as USB device, Network Filesystem device, PCIe Device, Network storage, shared storage, dynamic RAM disk (RAMDisk), etc.) may be authenticated during system enumeration, and validation checks may be based on VendorID (VID), ProductID (PID) and/or authentication tokens by a DXE loader to ensure that each such given hardware image source device is an authenticated device. Once each such device is so authenticated, it may be added to a list of authenticated devices. During the DXE stage of a UEFI Boot, a VDP protocol instance which has the list of UEFI device path-to-virtual device path mapping may be created to ensure that the UEFI DXE loader has the correct privilege to run applications and other UEFI images listed on the VDP protocol in either a Secure Boot or Non Secure Boot environment. The disclosed systems and methods may be so implemented in one embodiment to authenticate and enable UEFI images for loading by a UEFI DXE loader in either a secure boot or non-secure boot UEFI environment, without the need to sign the UEFI images. Moreover, the disclosed trusted hardware path methodology may be implemented to prevent malware injection from unknown devices during a non-secure boot mode. In one embodiment, in the case where SecureBoot is enabled, and VDP protocol is enabled, then these images may bypass SecureBoot check or Non-SecureBoot checks and enable a faster boot.

Thus, in one embodiment VDP protocol may be used to map virtual device path to authenticated hardware image source UEFI device path for authentication to avoid conventional UEFI image signing authentication process overheads (e.g., such as first requiring signing of an UEFI image itself by an OS manufacturer) by allowing a given entity (such as a computer manufacturer/assembler/fabrication, OEM vendor, etc.) to provide an authenticated UEFI device path that contains UEFI image/s. In this way, any new authenticated hardware image source device may be mapped using the VDP protocol to have a list of UEFI images. These UEFI image/s may then be authenticated and loaded based on the VDP protocol virtual device path mapped to the authenticated hardware image source device rather than requiring signing of the actual UEFI images. In this way, the UEFI images may be launched faster since LoadImage( ) bypass the regular security checks conventionally required for each of these UEFI images, and these UEFI images may be loaded securely using the VDP Protocol check on the authenticated hardware image source device such that the cost of signing proprietary and trusted files may be avoided. Thus, this use of VDP protocol results in faster load and/or boot time, ensuring that the UEFI Boot of the system is faster and is also secure in launching UEFI images from the virtual device path-mapped location. Moreover, in another exemplary embodiment, the disclosed systems and methods may similarly employ VDP protocol to allow loading and execution of UEFI images from RAM disks created at runtime on authenticated RAM hardware devices, so as to allow both secure and faster load and/or boot from such RAM devices. This is in contrast to a conventional boot environment where a full UEFI secure boot verification is required, i.e., since having a pre-determined UEFI device path for such RAM disks is not possible and therefore a full UEFI secure boot verification is required.

In one respect, disclosed herein is an information handling system, including: at least one processing device configured to execute a host operating system (OS); memory coupled to the processing device, the memory having virtual device path mapping (VDP) mapping information stored thereon; and a communication bus coupled to the processing device, the communication media being configured to couple a hardware image source device in data communication with the processing device. The processing device may be configured to perform the following steps prior to loading the OS: identify a given Unified Extensible Firmware Interface (UEFI) image that is present on a given hardware image source device that is coupled by the communication bus to communicate with the processing device; access the VDP mapping information in the memory of the information handling system to determine whether or not VDP is enabled for a UEFI device path of the given hardware image source device and then: use the VDP mapping information to load the identified given UEFI image from the hardware image source device into the memory of the information handling system for execution by the at least one processing device if VDP mapping is determined to be enabled for the given hardware image source device, and not load the identified given UEFI image from the hardware image source device into memory of the information handling system if VDP mapping is determined not to be enabled for the given hardware image source device.

In another respect, disclosed herein is a method, including using at least one processing device of an information handling system to perform the following steps prior to loading an operating system (OS): identify a given Unified Extensible Firmware Interface (UEFI) image that is present on a given hardware image source device that is coupled to communicate with the processing device; access virtual device path mapping (VDP) mapping information in memory of the information handling system to determine whether or not VDP is enabled for a UEFI device path of the given hardware image source device and then: use the VDP mapping information to load the identified given UEFI image from the hardware image source device into memory of the information handling system for execution by the at least one processing device if VDP mapping is determined to be enabled for the given hardware image source device, and not load the identified given UEFI image from the hardware image source device into memory of the information handling system if VDP mapping is determined not to be enabled for the given hardware image source device.

DESCRIPTION OF ILLUSTRATIVE EMBODIMENTS

Figure 1:
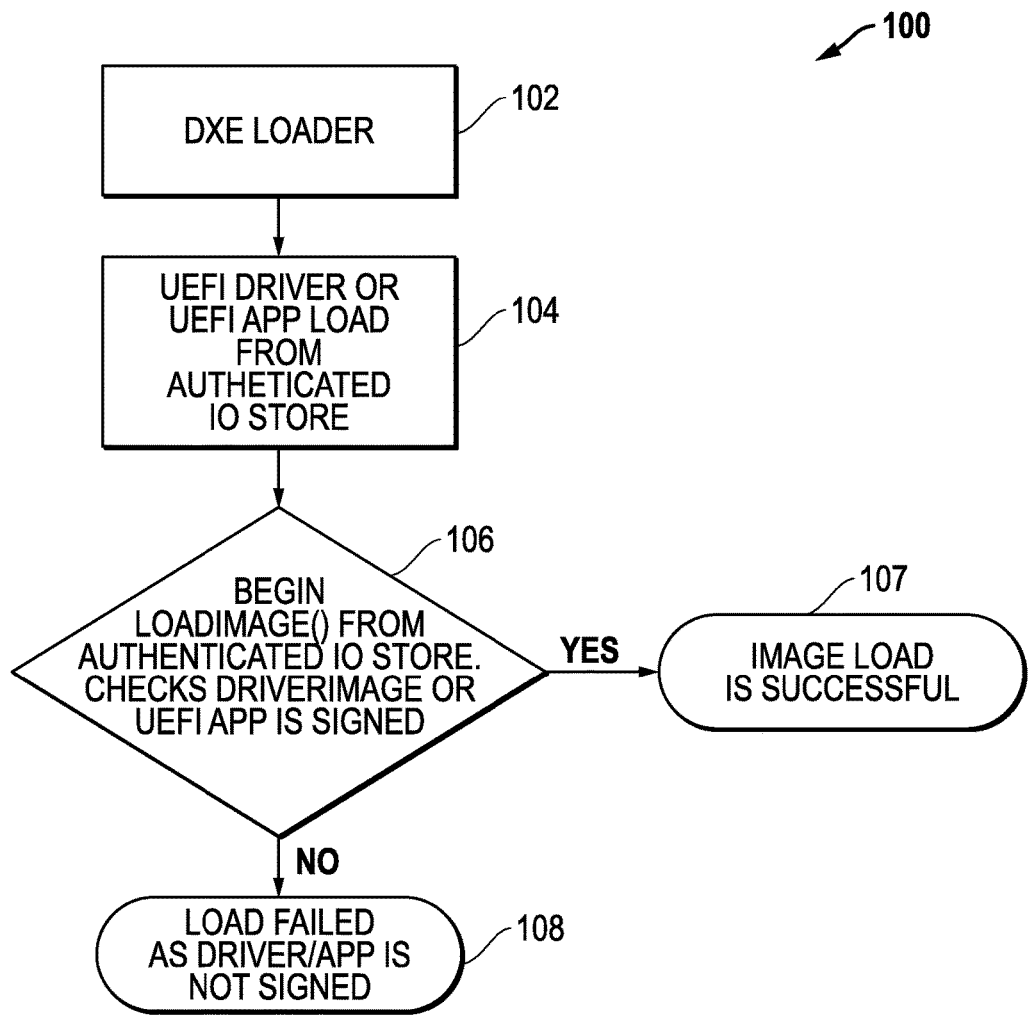
FIG. 1 illustrates conventional UEFI secure boot methodology.
Figure 2:
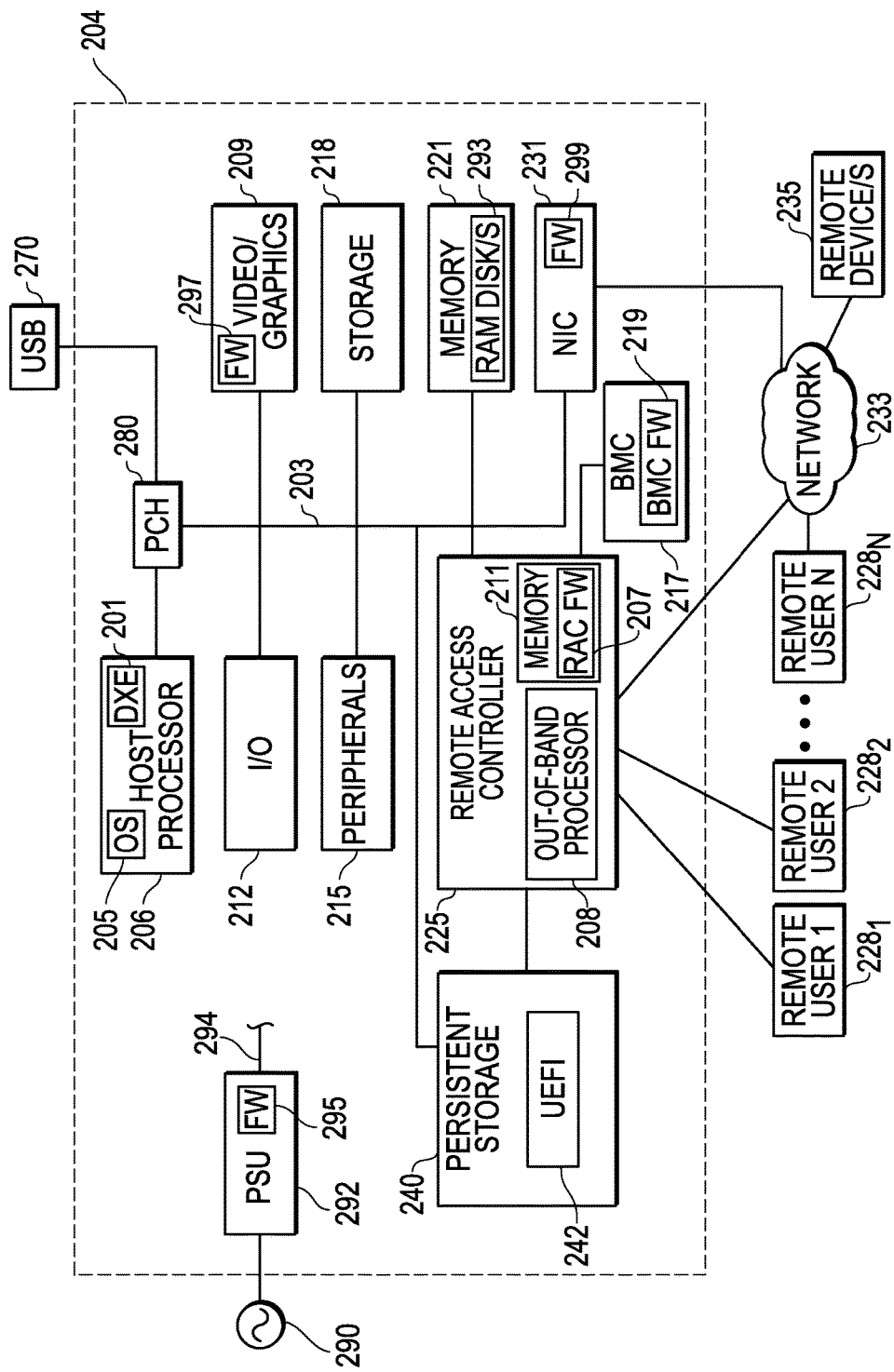
FIG. 2 illustrates a block diagram of an information handling system according to one exemplary embodiment of the disclosed systems and methods.

FIG. 2 is a block diagram of an information handling system 204 (e.g., such as a server) as it may be configured according to one exemplary embodiment. As shown, system 204 may include at least one host processing device/s 206 (e.g., AMD or Intel-based CPU such as Itanium or any other type of suitable host processing device), one or more buses or communication media 203 (e.g., PCIe bus, USB, SMBus, SATA, other appropriate data buses such as memory bus, etc.), video/graphics hardware (e.g., video adapter or graphics processor unit) 209 (with video/graphics component firmware 297), storage 218, system volatile memory (e.g., DRAM) 221, local input/output (I/O) 212, peripherals 215, and remote access controller (RAC) 225 having one or more out-of-band processing devices 208 and memory 211 that stores remote access controller component firmware 207.

Examples of remote access controller 225 include an integrated Dell Remote Access Controller (iDRAC) available from Dell Products L.P. of Round Rock, Tex., etc.). As shown in the exemplary embodiment of FIG. 2, out-of-band processing device 208 is a separate and independent processing device from any in-band host central processing unit (CPU) such as host processing device/s 206 that is configured to load and run UEFI 242 (with DXE loader 201 as shown) as well as host OS 205 (e.g., Microsoft Windows-based OS, Linux-based OS, etc.). In this regard, out-of-band processing device 208 may operate without management of UEFI 242, any separate system BIOS and any application executing with a host OS 205 on the host processing device/s 206.

Bus/es 203 provides a mechanism for the various components of system 204 to communicate and couple with one another. As shown, host processing device/s 206 may be coupled in on embodiment to bus/es 203 via embedded platform controller hub (PCH) 280 which may be present to facilitate input/output functions for the processing device/s 206 with various internal components of information handling system 100. Host processing device/s 206 may be an in-band processing device configured to run a host operating system (OS), and out-of-band processing device 208 of remote access controller 225 may be a service processor, baseboard management controller (BMC) embedded processor, etc. Video/graphics 209, storage 218, memory 221, I/O 212 and optional peripherals 215 (e.g., keyboard, mouse, etc.) may have the structure, and perform the functions known to those of skill in the art. Besides volatile memory 221 (e.g., random access memory "RAM"), processor 206 may include cache memory for storage of frequently accessed data, and storage 218 may include extended memory for processing device/s 206. Information handling system 204 may also include a network access card (NIC) 231 (with its component firmware 299) that is communicatively coupled to network 233 (e.g., Internet or corporate intranet) as shown to allow various components of system 204 to communicate with external and/or remote device/s 235 across network 233. Other external devices, such as external universal serial bus (USB) device 270 may be coupled to processing device/s 206 via PCH 280 as shown. In this embodiment, information handling system 204 also includes power supply unit (PSU) 292 (including PSU component firmware 295) that is coupled to receive power from AC mains 290 and to perform appropriate power conversion and voltage regulation to produce regulated internal power 294 for use by other power-consuming components of system 204.

Still referring to FIG. 2, remote access controller 225 is coupled to persistent non-volatile memory storage 240 (e.g., embedded and partitioned flash memory, Electrically Erasable Programmable Read Only Memory—EEPROM, other types of non-volatile random access memory "NVRAM", etc.) that is configured to store persistent information for remote access controller 225 and information for other system components, e.g., including Unified Extensible Firmware Interface (UEFI) firmware 242 as well as other information such as Advanced Configuration and Power Interface (ACPI) information, other system BIOS firmware (e.g., in the form of system management SMBIOS data), etc. It will be understood that system persistent storage 240 may be implemented by one or more non-volatile memory storage devices and that in other embodiments, non-volatile memory or other non-volatile memory storage device/s (e.g., such as hard disk drive and/or optical drive, etc.) may also or alternatively be provided elsewhere in system 204 for storing such information, e.g., such as media drives of storage 218. In this embodiment, system 204 also includes a baseboard management controller (BMC) 217 that is communicatively coupled to remote access controller 225 as shown. BMC 217 includes integrated non-volatile memory 219 for storing BMC component firmware 219 for execution by BMC 217. As shown, in the embodiment of FIG. 2 remote access controller 225 optionally may provide access to a plurality of remote users $228_1$-$228_N$, although access may be provided to a single user 228 in other embodiments. In this regard, remote access controller 225 may be configured to allow remote users to manage, administer, use, and/or access various resources of host system 204 (e.g., either native or virtual) from a remote location, e.g., via network 233 and/or other suitable communication media.

As described further herein, one or more authenticated hardware image source device/s (i.e., authenticated IO store/s) may be coupled to provide UEFI images (e.g., UEFI Applications, UEFI Drivers, UEFI firmware volumes, etc.) for loading and execution by host processing device 206 of information handling system 204. In one embodiment, such authenticated hardware image source device/s may include hardware devices that are authenticated, for example, by a computer manufacturer, OEM, or another designated entity having knowledge and/or control of the hardware image source device and the UEFI images (e.g., such as OEM or computer manufacturer proprietary files) contained thereon and/or provided therefrom. For example, an authenticated hardware image source device/s may be a hardware device having UEFI images that is obtained from a known OEM (e.g., vendor) source of the hardware device, and/or that is sourced by a manufacturer, fabricator or assembler of the information handling system 204 itself. Specific examples of authenticated hardware image source device/s include remote device/s 235 (e.g., network storage, network file system device, shared storage, etc.), external USB device 270, PCIe devices (e.g., such as video adapter/GPU 209, NIC 231, etc.), dynamic RAM disks 293 created on system memory 221, etc. It will be understood that these examples are exemplary only, and that other types of hardware devices may be as authenticated hardware image source devices and/or that a given device may be coupled to host processing device/s 206 using any suitable media, e.g., video adapter and GPU 209, NIC 231 may be alternatively coupled as USB devices to host processing device/s 206, etc.

It will be understood that the embodiment of FIG. 2 is exemplary only, and that an information handling system may be provided with one or more processing devices that may perform the functions of host processing device/s 206, out-of-band processing device 208, BMC 217, etc. Examples of such processing devices include, but are not limited to, central processing units (CPUs), embedded controllers, microcontrollers, application specific integrated circuits (ASICs), field programmable gate arrays (FPGAs), etc. It will also be understood that the particular configuration of FIG. 2 is exemplary only, and that other information handling system architectures may be employed in the practice of the disclosed systems and methods.

Figure 3:
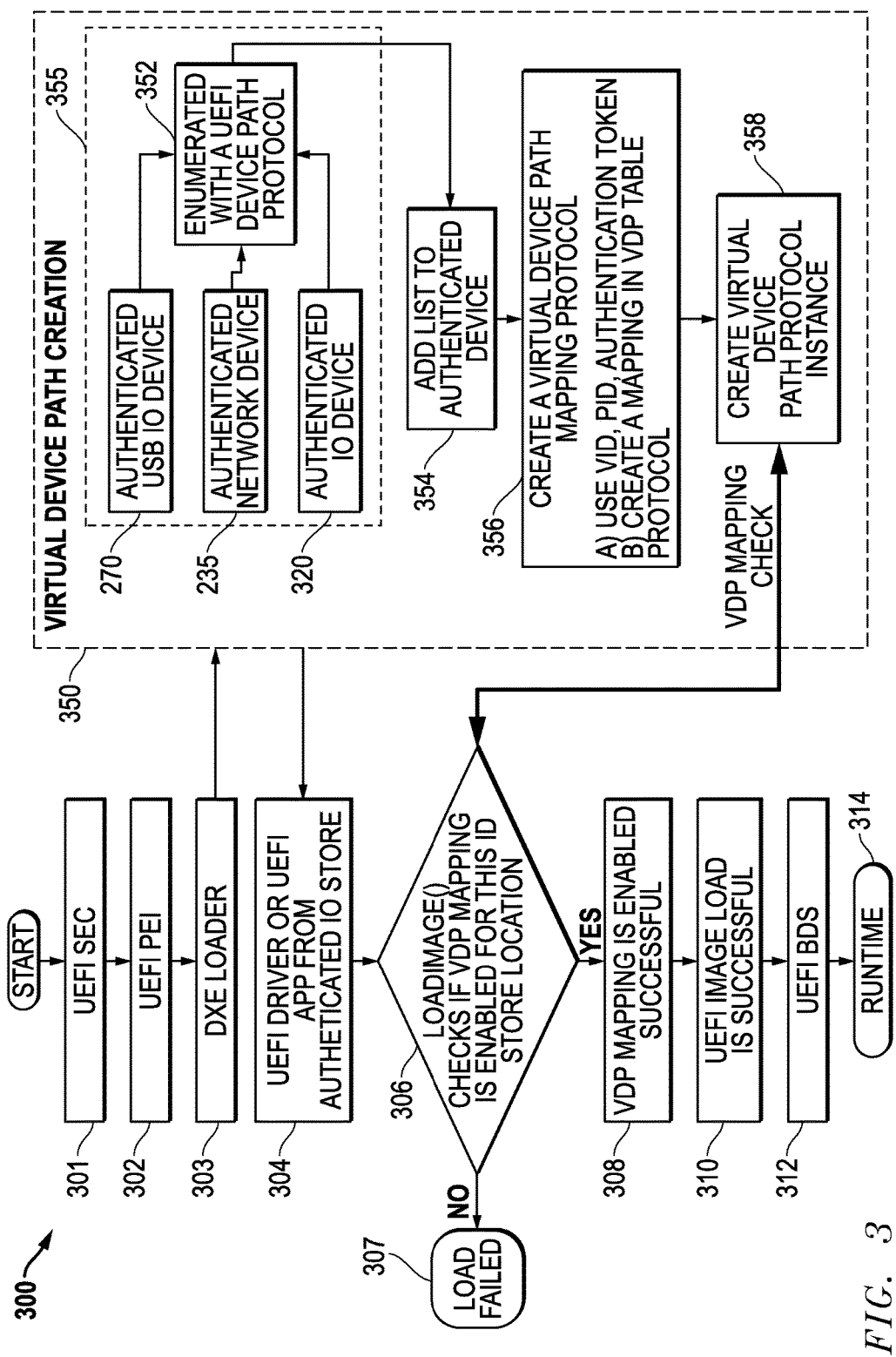
FIG. 3 illustrates UEFI boot methodology according to one exemplary embodiment of the disclosed systems and methods.

FIG. 3 illustrates UEFI boot methodology 300 that may performed by executing UEFI 242 on host processing device/s 206 of FIG. 2 to load UEFI images (e.g., UEFI Applications, UEFI Drivers, UEFI firmware volumes, etc.). It will be understood that methodology 300 is described in relation to FIG. 2 for purposes of illustration only, and that methodology 300 may be implemented by at least one information handling system processing device with any other suitable combination of information handling system components for loading and executing UEFI images from one or more authenticated hardware image source devices.

As shown in FIG. 3, methodology 300 begins at UEFI initialization upon startup or reboot of information handling system 104 with UEFI security (SEC) phase of step 301 in which pre-RAM code is employed for initialization of host processing device 206 to create a temporary stack in host processing device cache to allow the following UEFI phases to proceed. Next, UEFI pre-EFI initialization (PEI) phase of step 302 occurs where host processing device initialization is completed, memory 221 (e.g., DRAM) is discovered and boot mode is determined. Upon completion of UEFI PEI phase 302, UEFI DXE phase occurs as shown during steps 303-310, and is employed to load UEFI images, e.g., for initializing the rest of the system hardware of information handling system 104. After completion of UEFI DXE phase in step 310 of FIG. 3, UEFI boot device selection (BDS) phase occurs in step 312, where boot devices are found, the OS 205 is loaded, and control is passed to the OS 205. OS runtime then proceeds in step 314 as shown.

Still referring to FIG. 3, DXE loader 201 proceeds from step 303 to VDP creation process 350 where VDP protocol instance is created to allow secure loading of UEFI firmware images from authenticated hardware image source device/s. It will be understood that the steps of VDP creation process 350 may be performed in one embodiment for loading UEFI images during first installation of corresponding system hardware components at a factory facility, e.g., during manufacture or assembly of an information handling system 204 by a computer manufacturer or other entity responsible for manufacture or assembly of the information handling system during manufacture or assembly of the information handling system. For example, VDP Creation process 350 may be pre-fixed by the manufacturer/fabricator/OEM UEFI Firmware BIOS 242 (which knows the exact hardware-to-Virtual Device path mappings to be performed at factory installation), and the VDP protocol Instantiation may happen during the initial Boot time of the firmware. However, it will be understood that in other embodiments the methodology VDP creation process 350 may be performed at any other suitable time.

In FIG. 3, VDP creation process 350 begins with an authenticated hardware device enumeration phase 355 as shown in step 270 where authenticated hardware image source device/s (i.e., authenticated IO store/s) are identified by DXE loader 201 as being coupled to the host processing device/s 206 of information handling system 204. Such hardware image source devices may be authenticated during system assembly or manufacture, for example, by a computer manufacturer, OEM, or another designated entity having knowledge and/or control of a known hardware image source device and the UEFI images (e.g., such as OEM or computer manufacturer proprietary files) contained thereon and/or provided therefrom. In other cases, UEFI Firmware BIOS may also create a RAMDisk 293 at Runtime of UEFI firmware 242 and also create a VDP mapping for RAMDisk 293 to Authenticated Device path using the methodology of FIG. 3 described further below.

Examples of hardware image source devices include, but are not limited to, USB IO device/s 270, network device/s 235 and any other IO device/s 320 (e.g., such as RAMDisk 293 on Host Memory 221) that may be coupled to host processing device/s 206 during system assembly. Completion of authentication for hardware image source device/s may be performed in any suitable manner appropriate for a given type of hardware device and/or based on system implementation specifics, e.g., such as by exchanging authentication tokens between the individual hardware devices and DXE 201 on processing device 204, network path authentication methods such as Password access to Network share, etc. Each of these authenticated hardware image source device/s 270, 235 and 320 are then each enumerated with a UEFI device path protocol in step 352 as shown in FIG. 3. This UEFI device path protocol provides a data structure description of where a corresponding given hardware device is within the information handling system 204, i.e., by providing a series of records (or "nodes") that describe the logical path from the software running on host processing device/s 206 through the bus/es 203 (e.g., PCIe, USB, etc.) and industry standard protocols (e.g., SCSI or IPv4) until it reaches the hardware device itself. In one embodiment, a UEFI device path may be determined for each given hardware image source device from an entity responsible for manufacture or assembly of the information handling system during manufacture or assembly of the information handling system.

Further information on UEFI device path protocol may be found described in U.S. patent application Ser. No. 14/703,912 filed on May 5, 2015, which is incorporated herein by reference in its entirety. In this regard, following is a hypothetical device path:

PciRoot(0)/PCI(1,0)/SAS(0x31000004CF13F6BD, 0, SAS)

In this example, the foregoing Device Path refers to a SAS (Serial-Attached SCSI) device attached to a SAS controller PCI device on device 1, function 0 on the first PCI root bus in system 204. That device is further identified by 0x31000004cf13f6b (the SAS address), 0 (the SAS unit number) and the keyword SAS which refers to how the device has been configured. Using the LocateDevicePath( ) operation provided by UEFI 242, processing device/s 206 may obtain the Device Path and, once in possession of the Device Path, processing device/s 206 may perform one or more operations upon the identified device. Examples of such operations include, but are not limited to, action(s) upon an UEFI file system, UEFI shell, UEFI application, or UEFI driver.

In some embodiments, the UEFI Device Path Protocol may accommodate or include different types of Device Paths including, for example, a Hardware Device Path, an ACPI Device Path, a Messaging Device Path, a Media Device Path, a BIOS Boot Specification Device Path, and an End of Hardware Device Path.

A Hardware Device Path defines how a device is attached to the resource domain of system 204, where resource domain is simply the shared memory, memory mapped I/O, and I/O space of system 204. An ACPI Device Path is used to describe devices whose enumeration is not described in an industry-standard fashion. A Messaging Device Path is used to describe the connection of devices outside the resource domain of system 204. This Device Path can describe physical messaging information such as a SCSI ID, or abstract information such as networking protocol IP addresses. A Media Device Path is used to describe the portion of a medium that is being abstracted by a boot service. For example, a Media Device Path may define which partition on a hard drive is being used. A BIOS Boot Specification Device Path is used to point to boot legacy operating systems. An End of Hardware Device Path may be used to indicate the end of the Device Path instance or Device Path structure.

After completion of step 352, the authenticated hardware device enumeration phase 355 proceeds to step 354 as shown, where the enumerated UEFI device path protocol of the authenticated hardware image source devices from step 352 are added to a list of authenticated devices. Next, in step 356 a VDP path protocol is created which includes a list of UEFI (e.g., Hardware or other) DevicePath-to-Virtual DevicePath mapping, e.g., in the form of mapping included in a VDP Table Protocol that may also include, for example, VDP mapping-to-Authenticated Device Path for RAM-Disk/s 293 created during runtime by UEFI firmware 242. The example below illustrates an exemplary form of VDP table protocol that maps Hardware DevicePath to Virtual DevicePath for each of the authenticated hardware image source devices from step 352, it being understood that any alternative form may be utilized for mapping UEFI (e.g., Hardware or other) Hardware DevicePath to Virtual DevicePath for authenticated hardware image sources. In one exemplary embodiment, the VDP protocol mapping may be stored on NVRAM of persistent storage 242 for future access, although the VDP protocol mapping may be stored in any other memory or storage devices, e.g., such as system memory 221. Next, in step 358 a VDP path protocol instance is created, and VDP creation process 350 exits to step 304 of methodology 300 as shown. In one embodiment, VDP Protocol is a UEFI Protocol to enable the VDP instance creation or mapping between a given UEFI device path-to-Virtual Device path mappings for a given hardware image source device. VDP protocol mapping may be created in one embodiment based on the internal knowledge of the hardware device mapping, and VDP protocol may then create the VDP mappings of the Hardware mapping-to-virtual device path mappings on every boot.

Example VDP Table Protocol

PciRoot(0)/PCI(1,0)/SAS(0x31000004CF13F6BD, 0, SAS)_Virtual

In step 304, each individual UEFI image (e.g., UEFI driver, UEFI application, etc.) is identified that is present on a given hardware image source device or IO store (e.g., remote device/s 235, external USB device 270, PCIe devices, dynamic RAM disks 293 created on system memory 221, etc.) and coupled to communicate with host processing device 206. Next, in step 306, the LoadImage( ) function is configured to perform a VDP mapping check to confirm that VDP mapping is enabled with a virtual device path (e.g., as created in step 358) for the given hardware image source device or IO store location that includes the UEFI images identified in step 304. In performing step 306, LoadImage( ) may in one embodiment bypass and not perform the conventional UEFI security checks that are conventionally required. If it is determined that VDP mapping is not enabled by VDP protocol instance of step 358 with a virtual device path for the given IO store location, then the loading process fails in step 307 for the individual UEFI image present on the given hardware image source device or IO store. In case of such a failure, then step 304 and 306 may repeat for other individual UEFI images on other hardware image source device or IO store locations.

However, if it is determined that VDP mapping is enabled by VDP protocol instance of step 358 with a UEFT (e.g., Hardware) DevicePath-to-Virtual DevicePath mapping for the given hardware image source device or IO store location, then VDP mapping is successfully enabled in step 308 to allow DXE loader 201 to use the mapped Virtual DevicePath to retrieve the individual UEFT image from the given hardware image source device or IO store location. This ensures that UEFT DXE loader has the right privilege to load and run the UEFT images listed in the VDP protocol in Secure Boot or Non Secure Boot environment, and in the case where the UEFT images are unsigned. Methodology 300 then proceeds to step 310 where the UEFT image is successfully loaded by DXE loader 201 into system memory 221, e.g., without performing conventional UEFT security checks as mentioned above. Once the individual UEFT images are loaded from the corresponding authenticated hardware image source device/s or IO store/s, methodology 300 proceeds to BDS phase of step 312 where boot devices are found, the OS 205 is loaded, and control is passed to the OS 205. This is followed by OS runtime performed in step 314 as shown where OS 205 operates as applicable using the loaded UEFT images of step 310. When the conventional UEFT security checks are eliminated, it ensures that the UEFT Boot of the system 204 is faster than conventional UEFT Boot, while at the same time the UEFT Boot is also secure in launching UEFT images from the corresponding Virtual Device Path mapped locations of step 358. In one embodiment, steps 304 to 310 may be performed a single time before the execution of the UEFT image.

It will be understood that particular illustrated steps of methodology 300 are exemplary only, and that any other combination of additional, fewer and/or alternative steps may be employed that is suitable for loading UEFI images onto an information handling system from an authenticated hardware image source device or "IO store" based on a UEFT virtual device path that is mapped to an authenticated UEFT device path that is established for the authenticated hardware image source device.

It will also be understood that one or more of the tasks, functions, or methodologies described herein (e.g., including those described herein for components 206, 208, 209, 231, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. In one exemplary embodiment, such a processing device of the information handling system may be selected from the group consisting of a CPU, controller, microcontroller, processor, microprocessor, FPGA, and ASIC. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
   at least one processing device configured to execute a host operating system (OS);
   memory coupled to the processing device, the memory having virtual device path mapping (VDP) mapping information stored thereon; and
   a communication bus coupled to the processing device, the communication bus being configured to couple a hardware image source device in data communication with the processing device;
   where the processing device is configured to perform the following steps upon every boot of the information handling system and prior to loading the OS:
      identify one or more hardware image source devices as being coupled to the processing device,
      then enumerate the UEFI device paths for each of the identified hardware image source devices,
      then create VDP mapping information for each of the identified hardware image source devices that maps the enumerated UEFI device path of each corresponding identified hardware image source device to a VDP for the corresponding identified hardware image source device,
      then store the created VDP mapping information in the memory,
      then identify a given Unified Extensible Firmware Interface (UEFI) image that is present on a given hardware image source device that is coupled by the communication bus to communicate with the processing device,
      then access the previously-created VDP mapping information stored in the memory of the information handling system to determine whether or not the previously-created VDP mapping information includes a mapping of the UEFI device path of the given hardware image source device to a VDP for the given hardware image source device before attempting to load the identified given UEFI image, and then:
         use the VDP mapping information to load the identified given UEFI image from the hardware image source device into the memory of the information handling system for execution by the at least one processing device if the previously-created VDP mapping information is determined to include a mapping of the UEFI device path of the given hardware image source device to a VDP for the given hardware image source device, and
         not load the identified given UEFI image from the hardware image source device into memory of the information handling system if the previously-created VDP mapping information is determined not to include a mapping of the UEFI device path of the given hardware image source device to a VDP for the given hardware image source device.

2. The system of claim 1, where the UEFI images include at least one of an UEFI Application, UEFI Driver, or UEFI firmware volume.

3. The system of claim 1, where the hardware image source device includes at least one of a USB device, a network file system device, a Peripheral Component Interconnect Express (PCIe) device, a network storage, a shared storage, or a dynamic random access memory (RAM) disk.

4. The system of claim 1, where the identified given UEFI image is unsigned; and where the at least one processing device is further configured to:
   access the previously-created virtual device path mapping (VDP) mapping information stored in the memory of the information handling system to determine that the VDP mapping information includes a mapping of the UEFI device path of the given hardware image source device having the identified given unsigned UEFI image to a VDP for the given hardware image source device having the identified given unsigned UEFI image; and
   then use the VDP mapping information to load the identified given unsigned UEFI image from the given hardware image source device having the identified given unsigned UEFI image into the memory of the information handling system for execution by the at least one processing device in a non-secure UEFI boot environment.

5. The system of claim 4, where the memory comprises at least one of volatile memory and non-volatile memory; and where the at least one processing device is further configured to perform the following steps prior to loading the OS:
   identify the given hardware image source device having the identified given unsigned UEFI image as being coupled to the processing device;
   then enumerate the UEFI device path for the given hardware image source device having the identified given unsigned UEFI image;
   then create the VDP mapping information for the given hardware image source device having the identified given unsigned UEFI image that maps the enumerated UEFI device path of the given unsigned hardware image source device having the identified given unsigned UEFI image to a VDP for the given hardware image source device having the identified given unsigned UEFI image; and
   then store the created VDP mapping information in the memory.

6. The system of claim 1, where the at least one processing device is further configured to perform the following step prior to loading the OS and after accessing the created VDP mapping information stored in the memory of the information handling system:
then use the VDP mapping information to load identified UEFI images from each of the given hardware image source devices into memory of the information handling system for execution by the at least one processing device.

7. An information handling system, comprising:
at least one processing device configured to execute a host operating system (OS);
memory coupled to the processing device, the memory having virtual device path mapping (VDP) mapping information stored thereon; and
a communication bus coupled to the processing device, the communication bus being configured to couple a hardware image source device in data communication with the processing device;
where the processing device is configured to perform the following steps prior to loading the OS:
identify a given Unified Extensible Firmware Interface (UEFI) image that is present on a given hardware image source device that is coupled by the communication bus to communicate with the processing device;
access the VDP mapping information in the memory of the information handling system to determine whether or not VDP is enabled for a UEFI device path of the given hardware image source device and then:
use the VDP mapping information to load the identified given UEFI image from the hardware image source device into the memory of the information handling system for execution by the at least one processing device if VDP mapping is determined to be enabled for the given hardware image source device, and
not load the identified given UEFI image from the hardware image source device into memory of the information handling system if VDP mapping is determined not to be enabled for the given hardware image source device:
where the at least one processing device is further configured to perform the following steps prior to loading the OS:
authenticate one or more given hardware image source devices coupled to the processing device,
identify the one or more authenticated hardware image source devices as being coupled to the processing device,
enumerate the UEFI device paths for each of the identified authenticated hardware image source devices,
only create VDP mapping information for each of the identified authenticated hardware image source devices that maps the enumerated UEFI device path of each corresponding identified authenticated hardware image source device to a VDP for the corresponding identified authenticated hardware image source device, and not for any hardware image source device coupled to the processing device that is not authenticated, and
then use the VDP mapping information to load identified UEFI images from each of the identified authenticated hardware image source devices into memory of the information handling system for execution by the at least one processing device.

8. The system of claim 7, where the at least one processing device is further configured to execute a Driver Execution Environment (DXE) loader in the DXE stage of a UEFI Boot to perform the steps of authenticating the one or more given hardware image source devices, identifying the one or more authenticated hardware image source devices, enumerating the UEFI device paths for each of the identified authenticated hardware image source devices, and creating the VDP mapping information for each of the identified authenticated hardware image source devices.

9. The system of claim 7, where the at least one processing device is further configured to authenticate one or more given hardware image source devices coupled to the processing device prior to loading the OS by at least one of exchanging authentication tokens or a network path authentication method.

10. The system of claim 1, where the at least one processing device is further configured to create the VDP mapping information for the given hardware image source device that maps the UEFI device path of the given hardware image source device to a VDP assigned to the given hardware image source device.

11. A method, comprising using at least one processing device of an information handling system to perform the following steps upon every boot of the information handling system and prior to loading an operating system (OS):
identify one or more given hardware image source devices as being coupled to the processing device;
then enumerate the UEFI device paths for each of the identified given hardware image source devices;
then create VDP mapping information for each of the identified given hardware image source devices that maps the enumerated UEFI device path of each corresponding identified given hardware image source device to a VDP for the corresponding identified given hardware image source device;
then store the created VDP mapping information in a memory of the information handling system;
then identify a given Unified Extensible Firmware Interface (UEFI) image that is present on a given hardware image source device that is coupled to communicate with the processing device;
then access the previously-created virtual device path mapping (VDP) mapping information stored in the memory of the information handling system to determine whether or not the previously-created VDP mapping information includes a mapping of the UEFI device path of the given hardware image source device to a VDP for the given hardware image source device before attempting to load the identified given UEFI image, and then:
use the VDP mapping information to load the identified given UEFI image from the hardware image source device into memory of the information handling system for execution by the at least one processing device if the previously-created VDP mapping is determined to include a mapping of the UEFI device path of the given hardware image source device to a VDP for the given hardware image source device, and
not load the identified given UEFI image from the hardware image source device into memory of the information handling system if the previously-created VDP mapping is determined not to include a mapping of the UEFI device path of the given hardware image source device to a VDP for the given hardware image source device.

12. The method of claim 11, where the UEFI images include at least one of an UEFI Application, UEFI Driver, or UEFI firmware volume; and where the hardware image source device includes at least one of a USB device, a network file system device, a Peripheral Component Interconnect Express (PCIe) device, a network storage, a shared storage, or a dynamic random access memory (RAM) disk.

13. The method of claim 11, where the identified given UEFI image is unsigned; and where the method further comprises using the at least one processing device to:
   access the previously-created virtual device path mapping (VDP) mapping information stored in the memory of the information handling system to determine that the VDP mapping information includes a mapping of the UEFI device path of the given hardware image source device having the identified given unsigned UEFI image to a VDP for the given hardware image source device having the identified given unsigned UEFI image; and
   then use the VDP mapping information to load the identified given unsigned UEFI image from the given hardware image source device having the identified given unsigned UEFI image into the memory of the information handling system for execution by the at least one processing device in a non-secure UEFI boot environment.

14. The method of claim 13, further comprising using the at least one processing device to perform the following steps prior to loading the OS:
   identify the given hardware image source device having the identified given unsigned UEFI image as being coupled to the processing device;
   then enumerate the UEFI device path for the given hardware image source device having the identified given unsigned UEFI image; and
   then create the VDP mapping information for the given hardware image source device having the identified given unsigned UEFI image that maps the enumerated UEFI device path of the given unsigned hardware image source device having the identified given unsigned UEFI image to a VDP for the given hardware image source device having the identified given unsigned UEFI image; and
   then store the created VDP mapping information in the memory of the information handling system, the system memory comprising at least one of volatile memory and non-volatile memory.

15. The method of claim 11, further comprising using the at least one processing device to perform the following step prior to loading the OS and after accessing the created VDP mapping information stored in the memory of the information handling system:
   then use the VDP mapping information to load identified UEFI images from each of the given hardware image source devices into memory of the information handling system for execution by the at least one processing device.

16. A method, comprising using at least one processing device of an information handling system to perform the following steps prior to loading an operating system (OS):
   identify a given Unified Extensible Firmware Interface (UEFI) image that is present on a given hardware image source device that is coupled to communicate with the processing device; and
   access virtual device path mapping (VDP) mapping information in memory of the information handling system to determine whether or not VDP is enabled for a UEFI device path of the given hardware image source device and then:
      use the VDP mapping information to load the identified given UEFI image from the hardware image source device into memory of the information handling system for execution by the at least one processing device if VDP mapping is determined to be enabled for the given hardware image source device, and
      not load the identified given UEFI image from the hardware image source device into memory of the information handling system if VDP mapping is determined not to be enabled for the given hardware image source device;
   where the method further comprises using the at least one processing device to perform the following steps prior to loading the OS:
      authenticate one or more given hardware image source devices coupled to the processing device,
      identify the one or more authenticated hardware image source devices as being coupled to the processing device,
      enumerate the UEFI device paths for each of the identified authenticated hardware image source devices,
      only create VDP mapping information for each of the identified authenticated hardware image source devices that maps the enumerated UEFI device path of each corresponding identified authenticated hardware image source device to a VDP for the corresponding identified authenticated hardware image source device, and not for any hardware image source device coupled to the processing device that is not authenticated, and
      then use the VDP mapping information to load identified UEFI images from each of the identified authenticated hardware image source devices into memory of the information handling system for execution by the at least one processing device.

17. The method of claim 16, further comprising using the at least one processing device to execute a Driver Execution Environment (DXE) loader in the DXE stage of a UEFI Boot to perform the steps of authenticating the one or more given hardware image source devices, identifying the one or more authenticated hardware image source devices, enumerating the UEFI device paths for each of the identified authenticated hardware image source devices, and creating the VDP mapping information for each of the identified authenticated hardware image source devices.

18. The method of claim 16, further comprising using the at least one processing device to authenticate one or more given hardware image source devices coupled to the processing device prior to loading the OS by at least one of exchanging authentication tokens or a network path authentication method.

19. The method of claim 11, further comprising using the at least one processing device to create the VDP mapping information for the given hardware image source device that maps the UEFI device path of the given hardware image source device to a VDP assigned to the given hardware image source device.

20. The method of claim 19, further comprising using the at least one processing device to determine the UEFI device path for the given hardware image source device from an entity responsible for manufacture or assembly of the information handling system during manufacture or assembly of the information handling system.

* * * * *